United States Patent Office 3,325,512
Patented June 13, 1967

3,325,512
1,4-NAPHTHOQUINONES
William Lindsay Mosby, North Plainfield, N.J., assignor to American Cyanamid Company, Stamford, Conn., a corporation of Maine
No Drawing. Filed June 16, 1965, Ser. No. 464,539
4 Claims. (Cl. 260—326)

This invention relates to, and has for its object, the provision of a new class of compounds. More particularly, it relates to new 1,4-naphthoquinones of the formula:

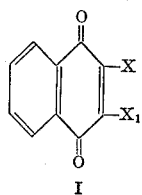

I wherein X and $X_1$ are —COOR, —CN or, when taken together,

and R is lower alkyl.

The compounds are useful in conventional amounts as depolarizers in normal primary cells.

The compound where X and $X_1$ are each COOR (Formula III) is obtainable by heating to the boil, in an inert solvent such as toluene, the corresponding dialkyl 1,4-dihydroxy-2,3-naphthalenedicarboxylate (Formula II) with a slight excess of a suitable oxidizing agent such as lead tetraacetate. The dihydroxy compound is disclosed in U.S. Patent No. 2,441,702. The imide is obtained by reacting at the boiling point a mixture of the diester product and an equimolar amount of ammonia. These reactions are illustrated in the following Equation 1:

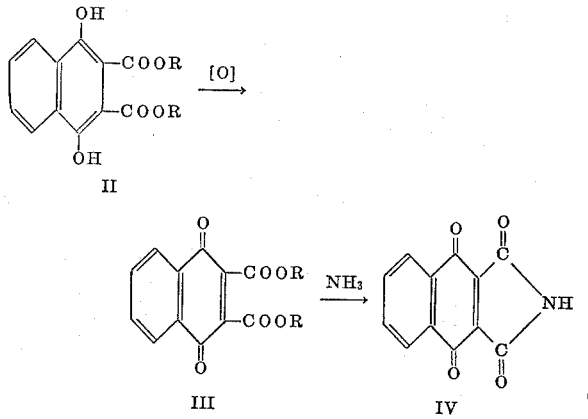

The compound wherein X and $X_1$ are CN (Formula VIII) is obtainable by first reacting a lower dialkyl phthalate (Formula V), such as diethyl phthalate, with succinonitrile (Formula VI) to give 1,2,3,4-tetrahydro-1,4-dioxo-2,3-naphthalenedicarboximide (Formula VII) and then treating the latter with a mild oxidizing agent such as ferric chloride. This is shown in the following Equation 2:

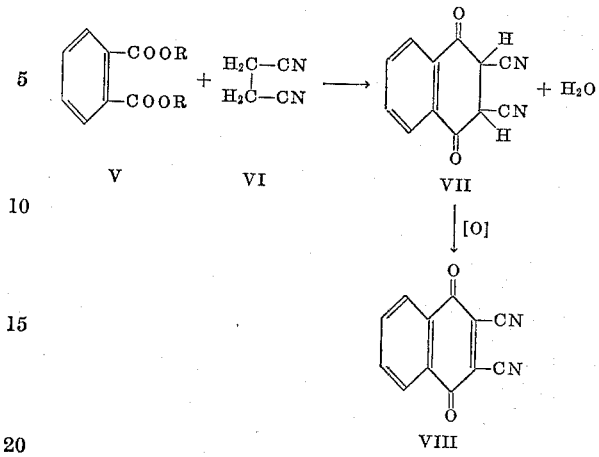

The following examples, in which parts and percentages are by weight, are presented to illustrate this invention.

Example 1.—*Diethyl 1,4-dihydro-1,4-dioxo-2,3-naphthalenedicarboxylate*

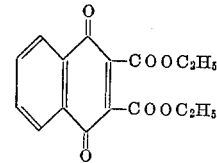

A mixture of 2.80 parts of diethyl 1,4-dihydroxy-2,3-naphthalenedicarboxylate, about 20 parts of toluene and 4.50 parts of lead tetraacetate is heated to the boiling point and then filtered. The residue obtained by evaporating the filtrate to dryness is dissolved in benzene. The solution is then passed through a chromatographic column of acid-washed alumina. Triturating the evaporated eluates with ligroin yields a product which, after crystallization from cyclohexane, is obtained as yellow needles melting at 53.7–54.7° C.

Example 2.—*1,4-dihydro-1,4-dioxo-2,3-naphthalenedicarboximide*

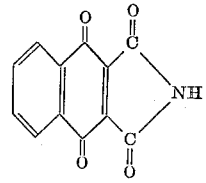

1.40 parts of diethyl 1,4-dihydro-1,4-dioxo-2,3-naphthalenedicarboxylate (product of Example 1) is triturated with about 5 parts of 28% aqueous ammonium hydroxide, and the mixture is heated at the boiling point. After cooling, a yellow precipitate is separated by filtration. The dry material is dissolved in methanol and precipitated with water. The precipitate is dissolved in ethyl acetate and the solution is passed through a chromatographic column of acid-washed alumina. From the eluate there are obtained gold-colored crystals melting at 131.2–132.2° C.

*Example 3.—1,4-dihydro-1,4-dioxo-2,3-naphthalenedicarbonitrile*

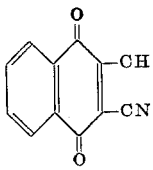

A mixture of 5.5 parts of sodium dissolved in about 40 parts of ethanol, 85 parts of diethyl phthalate and 8 parts of succinonitrile is heated for a short time until the mixture becomes thick. The reaction mixture is dissolved in water and the solution is extracted with ether. The aqueous phase is acidified with hydrochloric acid. The precipitate is separated, dried and heated in ethanol. An alcoholic solution of ferric chloride is added until the precipitate is completely dissolved. When the solution is poured into water, a yellow precipitate is obtained. After successive recrystallizations from nitromethane and acetonitrile, the yellow product melts at 272.0–273.5° C. with decomposition.

I claim:
1. A compound of the formula:

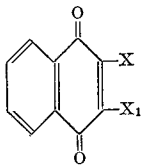

wherein X and $X_1$ are the same and are members selected from the group consisting of COOR, CN, and, when taken together,

and R is lower alkyl.

2. The compound diethyl 1,4-dihydro-1,4-dioxo-2,3-naphthalenedicarboxylate.
3. The compound 1,4-dihydro-1,4-dioxo-2,3-naphthalenedicarboximide.
4. The compound 1,4-dihydro-1,4-dioxo-2,3-naphthalenedicarbonitrile.

References Cited
UNITED STATES PATENTS 2,415,884   2/1947   Homeyer _____ 260—520

OTHER REFERENCES

Fieser et al., Organic Chemistry, 3rd Ed., D.C. Heath & Co., Boston, 1958, pp. 710–716.

Mosby et al., Jour. Chem. Soc., October 1964, pp. 3990–3994.

Reynolds et al., Jour. Org. Chem., vol. 29, December 1964, pp. 3591–3593.

ALEX MAZEL, *Primary Examiner.*

MARY U. O'BRIEN, JOSEPH A. NARCAVAGE,
*Assistant Examiners.*